(12) United States Patent
Li et al.

(10) Patent No.: US 11,835,703 B2
(45) Date of Patent: Dec. 5, 2023

(54) PERISCOPE LENS MODULE AND PRISM DEVICE APPLIED TO PERISCOPE LENS MODULE

(71) Applicant: AAC Optics Solutions Pte. Ltd., Singapore (SG)

(72) Inventors: Linzhen Li, Shenzhen (CN); Jiliang Lu, Shenzhen (CN); Gang Li, Shenzhen (CN); Jin Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 604 days.

(21) Appl. No.: 16/945,938

(22) Filed: Aug. 3, 2020

(65) Prior Publication Data

US 2020/0379238 A1  Dec. 3, 2020

Related U.S. Application Data

(63) Continuation of application No. PCT/CN2019/089728, filed on Jun. 1, 2019.

(51) Int. Cl.
| | | |
|---|---|---|
| *G02B 23/08* | (2006.01) | |
| *G02B 5/04* | (2006.01) | |
| *G02B 7/02* | (2021.01) | |
| *G02B 27/64* | (2006.01) | |

(52) U.S. Cl.
CPC ............. *G02B 23/08* (2013.01); *G02B 5/04* (2013.01); *G02B 7/02* (2013.01); *G02B 27/646* (2013.01)

(58) Field of Classification Search
CPC . G02B 23/08; G02B 5/04; G02B 7/02; G02B 27/646
USPC ......................................................... 359/402
See application file for complete search history.

(56) References Cited

U.S. PATENT DOCUMENTS

| 2,392,428 | A | * | 1/1946 | Swift, Jr. | ............... G02B 23/08 |
| | | | | | 359/503 |
| 2010/0118402 | A1 | * | 5/2010 | Washisu | ............... G02B 27/646 |
| | | | | | 359/557 |
| 2013/0177301 | A1 | * | 7/2013 | Nakayama | ........... G02B 27/646 |
| | | | | | 359/554 |
| 2015/0043076 | A1 | * | 2/2015 | Nakayama | ........... G02B 27/646 |
| | | | | | 359/557 |
| 2015/0195460 | A1 | * | 7/2015 | Yasuda | ............... H04N 5/23287 |
| | | | | | 359/557 |

(Continued)

*Primary Examiner* — William R Alexander
*Assistant Examiner* — Sharrief I Broome
(74) *Attorney, Agent, or Firm* — W&G Law Group

(57) ABSTRACT

Provided is a periscope lens module, including: a prism; a bearing member including a bearing frame; a ball; a supporting member including a prism bracket, a driving bracket, and a rotating bracket in rotation-fit with the ball; an elastic member; and a driving member. The elastic member includes a first elastic bracket including a first abutting portion, and a second elastic bracket including a second abutting portion. The first and second abutting portions are spaced from each other and abut against a top of the rotating bracket from two sides of the ball, in such a manner that the rotating bracket and the ball abut against the bearing frame. The driving member is connected between the bearing member and the driving bracket for driving the supporting member to drive the prism to rotate. This leads to a simple structure while achieving image stabilization.

16 Claims, 7 Drawing Sheets

(56) References Cited

U.S. PATENT DOCUMENTS

| | | | |
|---|---|---|---|
| 2015/0237259 A1* | 8/2015 | Yasuda | G02B 27/646 |
| | | | 348/208.11 |
| 2017/0139179 A1* | 5/2017 | Kim | H02K 41/0356 |
| 2019/0230262 A1* | 7/2019 | Wang | G03B 9/06 |

* cited by examiner

PERISCOPE LENS MODULE AND PRISM DEVICE APPLIED TO PERISCOPE LENS MODULE

TECHNICAL FIELD

The present invention relates to the technical field of optical imaging, and more particularly, to a periscope lens module and a prism device applied to the periscope lens module.

BACKGROUND

In recent years, with development of imaging technologies and rise of electronic products having imaging functions, optical lenses have been widely applied in various electronic products. The existing periscope lens modules require for a prism device having an image stabilization function.

SUMMARY

The present invention aims to provide a prism device applied to a periscope lens module, which can achieve an image stabilization function.

In order to achieve the purpose described above, the present provides a prism device applied to a periscope lens module, including: a prism; a bearing member; a supporting member; a ball; an elastic member; and a driving member. The bearing member includes a bearing frame. The ball is mounted to a top of the bearing frame. The supporting member includes a prism bracket, a driving bracket, and a rotating bracket connected between the prism bracket and the driving bracket and in rotation-fit with the ball. The elastic member includes a first elastic bracket and a second elastic bracket. The first elastic bracket includes a first abutting portion. The second elastic bracket includes a second abutting portion. The first abutting portion and the second abutting portion are spaced from each other and abut against a top of the rotating bracket from two sides of the ball, in such a manner that the rotating bracket and the ball abut against the bearing frame. The driving member is connected between the bearing member and the driving bracket and configured to drive the supporting member to drive the prism to rotate.

As an improvement, the top of the bearing frame is provided with a limiting groove for receiving and locating the ball, and a side of the rotating bracket facing towards the bearing frame is provided with an arc groove for fitting the ball.

As an improvement, the bearing member further includes: a fixing frame parallel to the driving bracket, and a base having an end connected to the fixing frame; and the bearing frame is provided on the base, and the driving member is connected between the fixing frame and the driving bracket.

As an improvement, the fixing frame includes: a side plate having an end connected to the base; an FPC board provided between the side plate and the driving bracket; and a plurality of snap joints provided between the side plate and the driving bracket. An end of each of the snap joints penetrates through the FPC board and the side plate to fix the FPC board onto the side plate.

As an improvement, an end of the side plate facing away from the base is provided with a first limiting plate for restricting the prism bracket from moving out of the bearing member, and an end of the base facing away from the fixing frame is provided with a second limiting plate for restricting the prism bracket from moving out of the bearing member.

As an improvement, the base is provided with a snap groove for limiting a movement of the bearing frame.

As an improvement, the first elastic bracket further includes: two first extending portions extending from two ends of the first abutting portion while being bent, two first bending portions each connected to an end of one of the two first extending portions, two second extending portions each extending from an end of one the two first bending portions, and two first mounting portions each bent from an end of one the two second extending portions. The second elastic bracket further includes: two third extending portions extending from two ends of the second abutting portion while being bent, two second bending portions each connected to an end of one of the third extending portions, two fourth extending portions each extending from an end of the two second bending portions, and two second mounting portions each bent from an end of one of the two fourth extending portions. Each of the first mounting portion and the second mounting portion is snapped into the snap groove.

As an improvement, the driving member includes a plurality of shape memory alloy wires. A plurality of hooks is provided at a side of the driving bracket close to the fixing frame. Each of the plurality of shape memory alloy wires includes two ends respectively fixed to two adjacent snap joints of the plurality of snap joints, and a middle portion connected to one of the plurality of hooks.

As an improvement, a first protrusion and a second protrusion are provided at a side of the rotating bracket facing away from the ball, the first abutting portion abuts against the first protrusion, and the second abutting portion abuts against the second protrusion.

The present invention further provides a periscope lens module, including: a lens device, an image sensor, and the prism device applied to the periscope lens module as described above. The lens device is arranged between the image sensor and the prism device applied to the periscope lens module.

The present invention has following beneficial effects. The driving member is connected between the bearing member and the driving bracket in such a manner that the driving member drives the driving bracket to move, thereby driving the rotating bracket to move about the ball. Moreover, a restoring force is provided by the first elastic bracket and the second elastic bracket, so as to drive the prism bracket to move, thereby adjusting an angle of the prism. This leads to a simple structure while achieving image stabilization.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

In the figures: 100. prism device applied to a periscope lens module; 1. prism; 2. bearing member; 21. bearing frame; 211. limiting groove; 22. fixing frame; 221. side plate; 222. FPC board; 223. snap joint; 224. first limiting plate; 225. second limiting plate; 226. snap groove; 23. base; 3. supporting member; 31. prism bracket; 32. driving bracket; 321. hook; 33. rotating bracket; 331. first protrusion; 332. second protrusion; 4. ball; 5. elastic member; 51. first elastic bracket; 511. first abutting portion; 512. first extending portion; 513. first bending portion; 514. second extending portion; 515. first mounting portion; 52. second elastic bracket; 521. second abutting portion; 522. third extending portion; 523. second bending portion; 524. fourth extending portion; 525. second mounting portion; 6. driving member; 60. shape memory alloy wire; 61. first shape memory alloy wire; 62. second shape memory alloy wire; 63. third shape memory alloy wire; 64. fourth shape memory alloy wire; 200. lens device; 300. image sensor.

DESCRIPTION OF EMBODIMENTS

The present invention will be further described in the following with reference to the accompany drawings and embodiments.

It should be noted that each directional indication (such as up, down, inner, outer, top, bottom, etc.) recited in the embodiments of the present invention is merely for explaining a relative position relation between components in a specific posture, or the like. If this specific posture changes, the directional indication changes accordingly.

It should also be noted that in a case where an element is referred to as being "fixed" or "provided" on another element, the element may be directly provided on the other element or there may be an intermediate element therebetween. In a case where an element is referred to as being "connected" to another element, the element may be directly connected to the other element or there may be an intermediate element therebetween.

Figure 1:
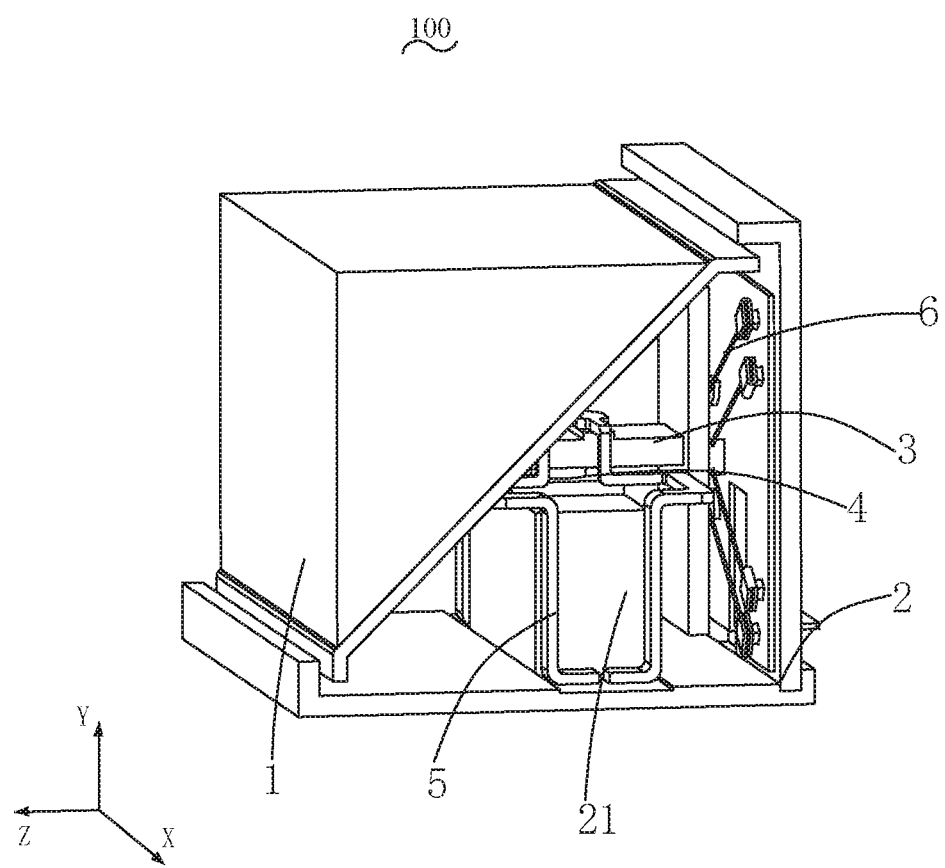
FIG. 1 is a schematic diagram of a prism device applied to a periscope lens module according to an embodiment of the present invention.
Figure 2:
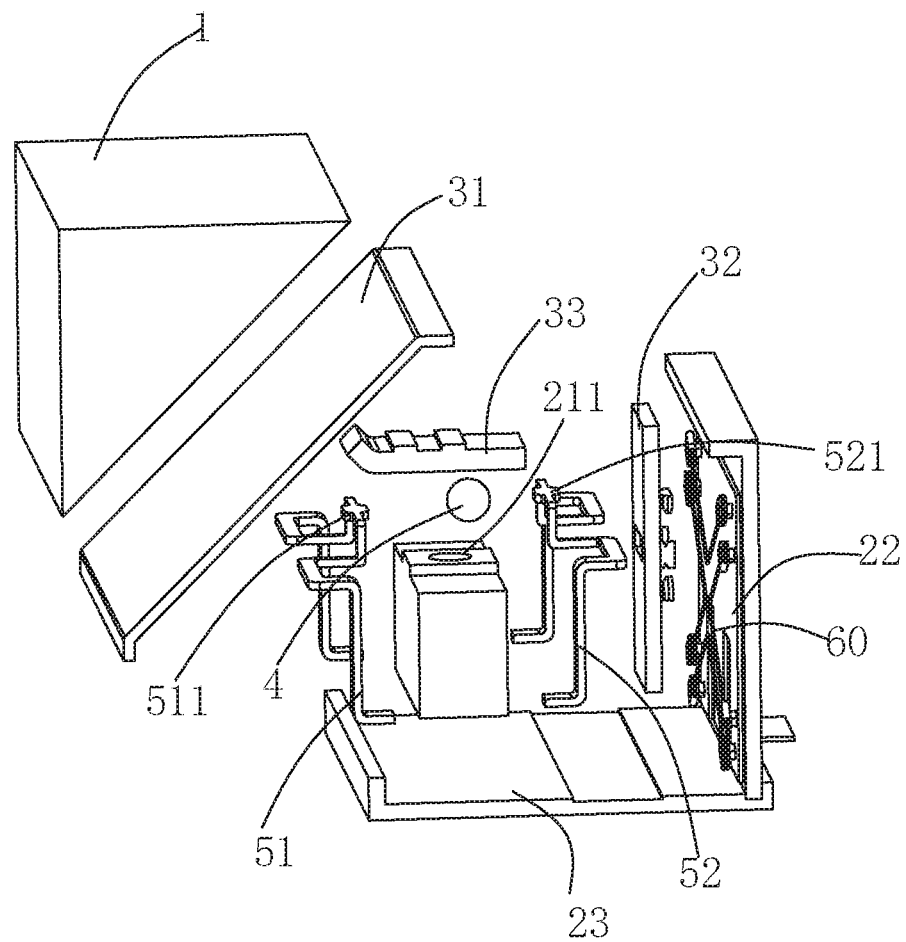
FIG. 2 is an exploded view of the prism device applied to the periscope lens module shown in FIG. 1.

With reference to FIG. 1 and FIG. 2, a prism device 100 applied to a periscope lens module provided by an embodiment of the present invention includes a prism 1, a bearing member 2, a supporting member 3, a ball 4, an elastic member 5, and a driving member 6. The bearing member 2 includes a bearing frame 21, and the ball 4 is mounted to a top of the bearing frame 21. The supporting member 3 includes a prism bracket 31, a driving bracket 32, and a rotating bracket 33 connected between the prism bracket 31 and the driving bracket 32 and in rotation-fit with the ball 4. The elastic member 5 includes a first elastic bracket 51 and a second elastic bracket 52. The first elastic bracket 51 includes a first abutting portion 511. The second elastic bracket 52 includes a second abutting portion 521. The first abutting portion 511 and the second abutting portion 521 abut against a top of the rotating bracket 33 from two sides of the ball 4, respectively, so that the rotating bracket 33 and the ball 4 abut against the bearing frame 21. The driving member 6 is connected between the bearing member 2 and the driving bracket 32 and is configured to drive the supporting member 3 to drive the prism 1 to rotate relative to the bearing member 2. Under an action of the driving member 6, the driving bracket 32 moves in a plane perpendicular to a Z axis, in such a manner that the rotating bracket 33 is driven to move about the ball 4, which in turn drives the prism bracket 31 to move. Moreover, a restoring force is provided by the first elastic bracket 51 and the second elastic bracket 52, so as to adjust an angle of the prism 1. This leads to a simple adjustment structure, thereby achieving image stabilization.

It should be noted that in the present invention, a width direction of the bearing frame 21 is defined as an X axis direction, a height direction of the bearing frame 21 is defined as a Y axis direction, and a length direction of the bearing frame 21 is defined as the Z axis direction. The X axis direction, the Y axis direction and The Z axis direction are perpendicular to each other.

As shown in FIG. 2, the top of the bearing frame 21 is provided with a limiting groove 211 for receiving and locating the ball 4, and a side of the rotating bracket 33 facing towards the bearing frame 21 is provided with an arc groove (not shown in the figure) for fitting the ball 4. The rotating bracket 33 can move about the ball 4 through fitting between the arc groove and the ball 4.

Figure 3:
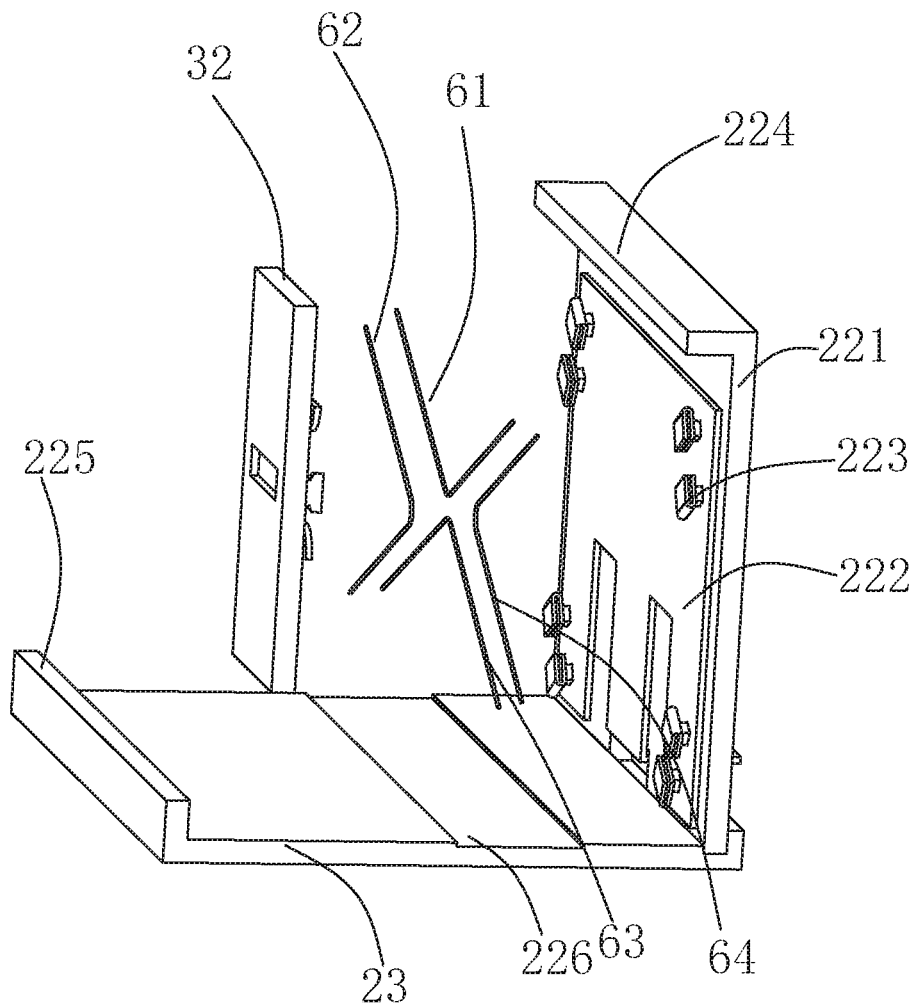
FIG. 3 is a schematic diagram of a bearing member according to an embodiment of the present invention.

As shown in FIG. 2 and FIG. 3, the bearing member 2 further includes a fixing frame 22 parallel to the driving bracket 32, and a base 23 connected to an end of the fixing frame 22. The bearing frame 21 is arranged on the base 23, the fixing frame 22 is arranged perpendicularly to the base 23, and the driving member 6 is connected between the fixing frame 22 and the driving bracket 32.

The fixing frame 22 includes: a side plate 221 having an end connected to the base 23; a flexible printed circuit board (FPC board) 222 provided between the side plate 221 and the driving bracket 32; and a number of snap joints 223. An end of the snap joint 223 penetrates through the FPC board 222 and the side plate 221 to fix the FPC board 222 onto the side plate 221. The FPC board 222 is configured to provide an electrical signal to the driving member 6, so as to control a movement of the driving member 6.

As shown in FIG. 1 to FIG. 3, an end of the side plate 221 facing away from the base 23 is provided with a first limiting plate 224 for restricting the prism bracket 31 from moving out of the bearing member 2, thereby limiting a displacement range of the prism bracket 31 in the Y axis direction. An end of the base 23 facing away from the fixing frame 22 is provided with a second limiting plate 225 for restricting the prism bracket 31 from moving out of the bearing member 2, thereby limiting a displacement range of the prism bracket 31 in the Z axis direction. The base 23 is provided with a snap groove 226 for limiting a movement of the bearing frame 21, and the bearing frame 21 is arranged in the snap groove 226 to achieving fixing of the bearing frame 21.

Figure 4:
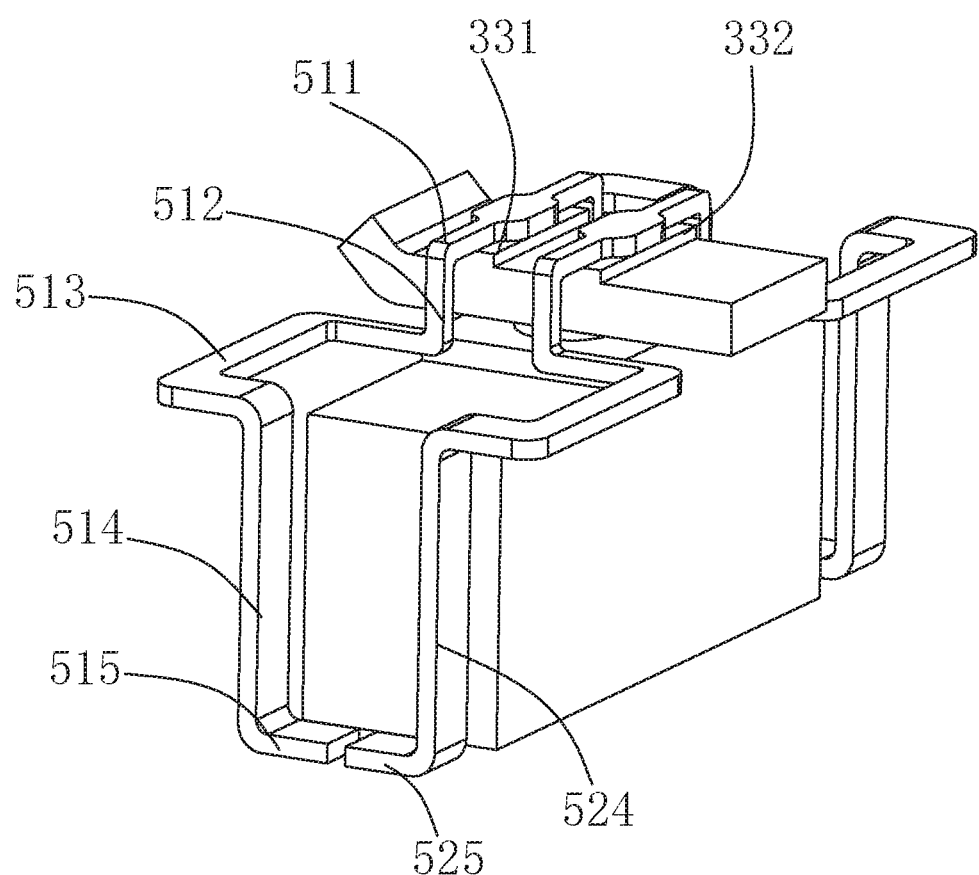
FIG. 4 is a schematic diagram of a bearing frame according to an embodiment of the present invention.
Figure 5:
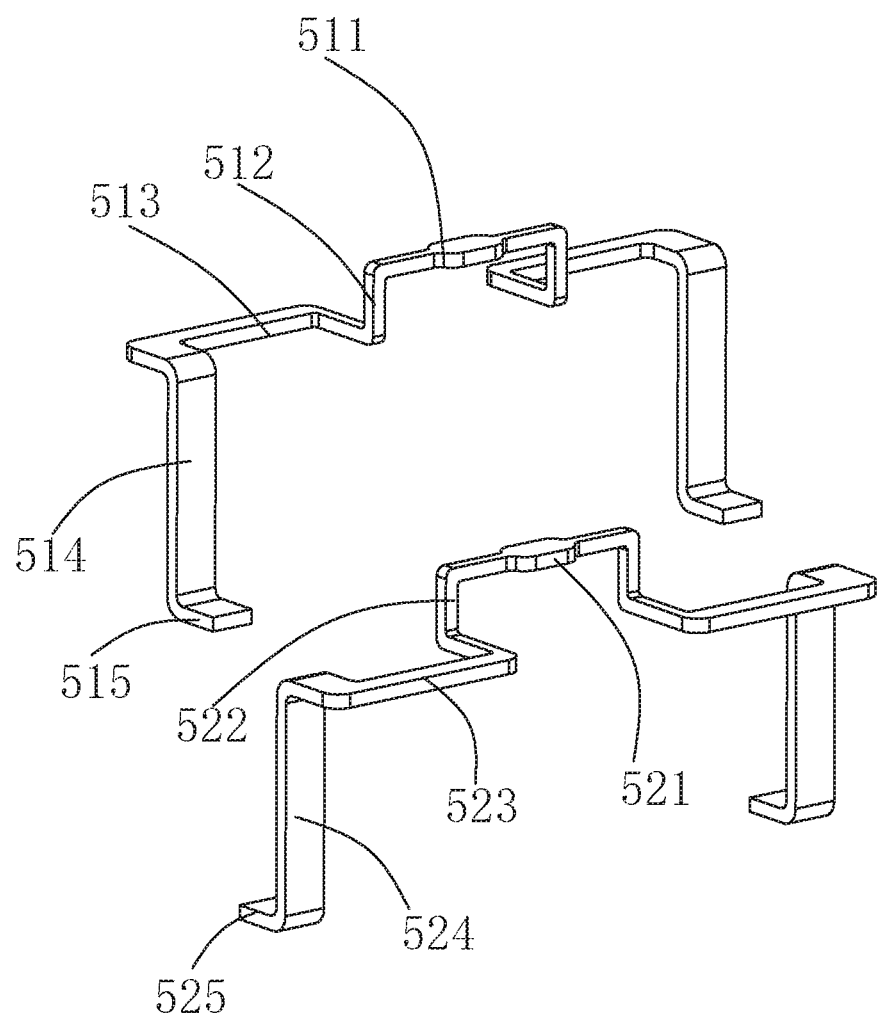
FIG. 5 is a schematic diagram of an elastic member 5 according to an embodiment of the present invention.

As shown in FIG. 4 and FIG. 5, the first elastic bracket 51 further includes two first extending portions 512 extending from two ends of the first abutting portion 511 while being bent, two first bending portions 513 each connected to an end of one of the two first extending portions 512, two second extending portions 514 each extending from an end of one of the two first bending portions 513, and two first mounting portions 515 each bent from an end of one of the two second extending portions 514. In an example, the first bending portion 513 has a U-shaped structure, and two ends of the U-shaped structure are respectively connected to the first extending portion 512 and the second extending portion 514. The first extending portion 512 is parallel to the second extending portion 514, and the first bending portion 513 is parallel to the base 23. The first mounting portion 515 is parallel to the base 23 and snapped into the snap groove 226. The two first mounting portions 515 respectively abut against two ends of the bearing frame 21.

The second elastic bracket 52 further includes two third extending portions 522 extending from two ends of the second abutting portion 521 while being bent, two second bending portions 523 connected to an end of one of the two third extending portions 522, two fourth extending portions 524 extending from an end of one of the two second bending portions 523, and two second mounting portions 525 each bent from an end of one of the two fourth extending portions 524. In an example, the second bending portion 523 has a U-shaped structure, and two ends of the U-shaped structure are connected to the third extending portion 522 and the fourth extending portion 524. The third extending portion 522 is parallel to the fourth extending portion 524, and the second bending portion 523 is parallel to the base 23. The second mounting portion 525 is parallel to the base 23 and is snapped into the snap groove 226. The two second mounting portions 525 respectively abut against two ends of the bearing frame 21.

A first protrusion 331 and a second protrusion 332 are provided at a side of the rotating bracket 33 facing away from the ball 4. The first abutting portion 511 abuts against the first protrusion 331, and the second abutting portion 521 abuts against the second protrusion 332, so as to improve an efficiency and accuracy of assembling between the elastic member 5 and the bearing frame 21. In an example, a middle part between the two ends of the first abutting portion 511 is provided with a portion having an increased width, so as to increase an abutment area between the first abutting portion 511 and the first protrusion 331. A middle part between the two ends of the second abutting portion 521 is provided with a portion having an increased width, so as to increase an abutment area between the second abutting portion 521 and the second protrusion 332.

Figure 6:
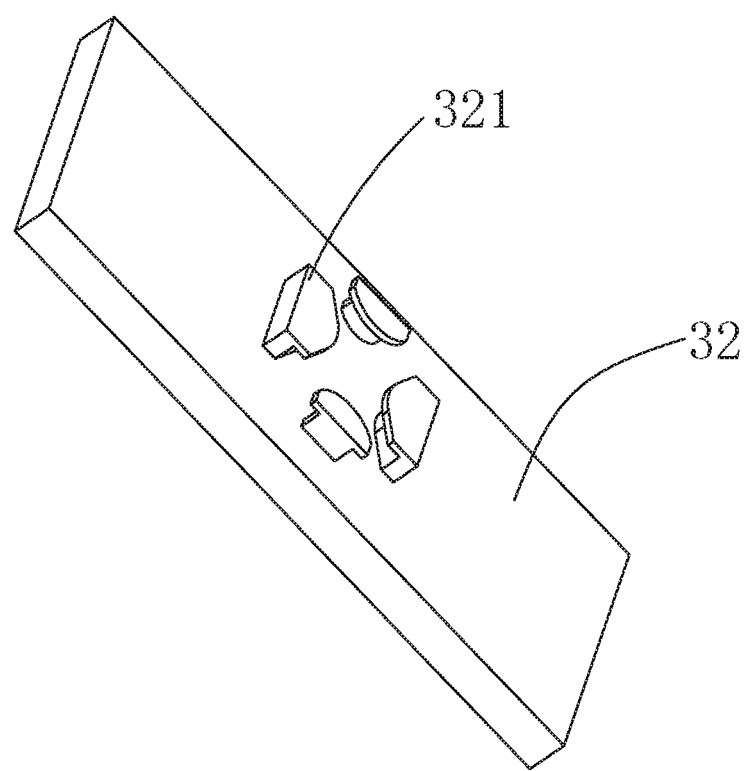
FIG. 6 is a schematic diagram of a driving bracket according to an embodiment of the present invention.

As shown in FIG. 2, FIG. 3 and FIG. 6, the driving member 6 includes a number of shape memory alloy wires 60. A side of the driving bracket 32 close to the fixing frame 22 is provided with a number of hooks 321. An end of the snap joint 223 facing away from the fixing frame 22 has a U-shaped structure. Each shape memory alloy wire 60 includes two ends respectively fixed into the U-shaped structures of two adjacent snap joints 223, and a middle portion connected to a respective hook 321. In an example, four shape memory alloy wires 60 and four hooks 321 are provided, and eight snap joints 223 are provided. Each pair of snap joints 223 among the eight snap joints 223 is arranged at one of four corners of the fixing frame 22. The four hooks 321 are arranged at a middle part of the driving bracket 32 with opposite pairs.

In an example, the four shape memory alloy wires 60 include a first shape memory alloy wire 61, a second shape memory alloy wire 62, a third shape memory alloy wire 63, and a fourth shape memory alloy wire 64. Each of the four shape memory alloy wires 60 is V-shaped. The first shape memory alloy wire 61 and the third shape memory alloy wire 63 are respectively arranged at an upper side and a lower side of the fixing frame 22 in a Y axis direction, and the first shape memory alloy wire 61 is located above the third shape memory alloy wire 63. The second shape memory alloy wire 62 and the fourth shape memory alloy wire 64 are respectively arranged at left and right sides of the fixing frame 22 in an X axis direction, and the second shape memory alloy wire 62 is located at the right side while the fourth shape memory alloy wire 64 is located at the left side.

During an operation, when the first shape memory alloy wire 61 is energized to be heated and shortened, the driving bracket 32 is subjected to an upward pulling force and transmits this force to the rotating bracket 33, so that the rotating bracket 33 rotates in a counterclockwise direction about the X axis by using the ball 4 as a fulcrum. As a result, the driving prism 1 is driven to rotate relative to the bearing frame 21 in a counterclockwise direction about the X axis. When the third shape memory alloy wire 63 is energized to be heated and shortened, the prism 1 can rotate relative to the bearing frame 21 in a clockwise direction about the X axis. When the second shape memory alloy wire 62 is energized to be heated and shortened, the prism 1 can rotate relative to the bearing frame 21 in one direction about the Y axis, and when the fourth shape memory alloy wire 64 is energized to be heated and shortened, the prism 1 can rotate relative to the bearing frame 21 in an opposite direction about the Y axis. The shape memory alloy wire 60 of the present invention may also be referred to as an SMA wire, which is a shape memory alloy wire in the related art and will not be described in details herein.

Figure 7:
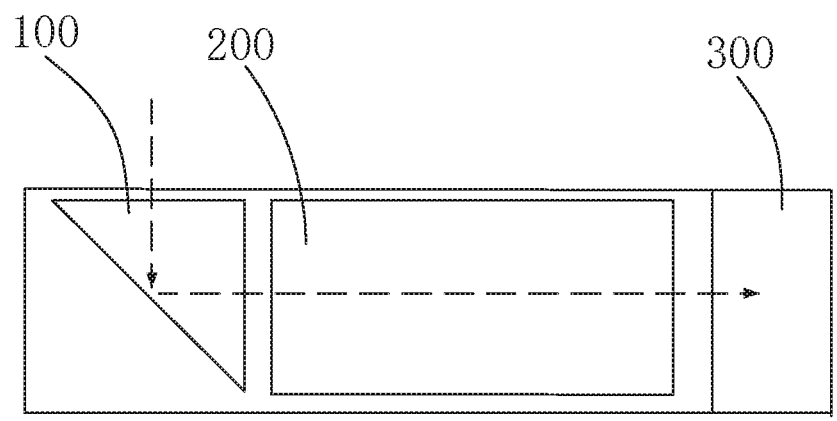
FIG. 7 is a schematic diagram of a periscope lens module according to an embodiment of the present invention.

With reference to FIG. 7, the present invention further provides a periscope lens module, which includes a lens device 200, an image sensor 300, and the above-mentioned prism device 100 applied to the periscope lens module. The lens device 200 is provided between the prism device 100 applied to the periscope lens module and the image sensor 300. After being reflected by the prism device 100 applied to the periscope lens module, light travels along a direction of an axis of the lens device 200 to reach the image sensor 300 in a straight line.

The above description merely illustrates some embodiments of the present invention. It should be noted that those skilled in the art can make improvements without departing from a creative concept of the present invention, but all these improvements shall fall into a scope of the present invention.

What is claimed is:

1. A prism device applied to a periscope lens module, comprising:
   a prism;
   a bearing member;
   a supporting member;
   a ball;
   an elastic member; and
   a driving member,
   wherein the bearing member comprises a bearing frame, and the ball is mounted to a top of the bearing frame; the supporting member comprises a prism bracket, a driving bracket, and a rotating bracket connected between the prism bracket and the driving bracket and in rotation-fit with the ball; the elastic member comprises a first elastic bracket and a second elastic bracket, the first elastic bracket comprises a first abutting portion, and the second elastic bracket comprises a second abutting portion; the first abutting portion and the second abutting portion are spaced from each other and abut against a top of the rotating bracket from two sides of the ball, in such a manner that the rotating bracket and the ball abut against the bearing frame; and the driving member is connected between the bearing member and the driving bracket and configured to drive the supporting member to drive the prism to rotate;
   wherein the bearing member further comprises: a fixing frame parallel to the driving bracket, and a base having an end connected to the fixing frame; and the bearing frame is provided on the base, and the driving member is connected between the fixing frame and the driving bracket wherein the fixing frame comprises:

a side plate having an end connected to the base;

an FPC board provided between the side plate and the driving bracket and a plurality of snap joints provided between the side plate and the driving bracket, wherein an end of each of the snap joints penetrates through the FPC board and the side plate to fix the FPC board onto the side plate.

2. The prism device applied to the periscope lens module as described in claim 1, wherein the top of the bearing frame is provided with a limiting groove for receiving and locating the ball, and a side of the rotating bracket facing towards the bearing frame is provided with an arc groove for fitting the ball.

3. The prism device applied to the periscope lens module as described in claim 2, wherein an end of the side plate facing away from the base is provided with a first limiting plate for restricting the prism bracket from moving out of the bearing member, and an end of the base facing away from the fixing frame is provided with a second limiting plate for restricting the prism bracket from moving out of the bearing member.

4. The prism device applied to the periscope lens module as described in claim 3, wherein the base is provided with a snap groove for limiting a movement of the bearing frame.

5. The prism device applied to the periscope lens module as described in claim 4, wherein the first elastic bracket further comprises: two first extending portions extending from two ends of the first abutting portion while being bent, two first bending portions each connected to an end of one of the two first extending portions, two second extending portions each extending from an end of one the two first bending portions, and two first mounting portions each bent from an end of one the two second extending portions; the second elastic bracket further comprises: two third extending portions extending from two ends of the second abutting portion while being bent, two second bending portions each connected to an end of one of the third extending portions, two fourth extending portions each extending from an end of the two second bending portions, and two second mounting portions each bent from an end of one of the two fourth extending portions; and each of the first mounting portion and the second mounting portion is snapped into the snap groove.

6. The prism device applied to the periscope lens module as described in claim 2, wherein the driving member comprises a plurality of shape memory alloy wires, and a plurality of hooks is provided at a side of the driving bracket close to the fixing frame; and each of the plurality of shape memory alloy wires comprises two ends respectively fixed to two adjacent snap joints of the plurality of snap joints, and a middle portion connected to one of the plurality of hooks.

7. The prism device applied to the periscope lens module as descried in claim 1, wherein a first protrusion and a second protrusion are provided at a side of the rotating bracket facing away from the ball, the first abutting portion abuts against the first protrusion, and the second abutting portion abuts against the second protrusion.

8. A periscope lens module, comprising:

a lens device;

an image sensor; and a prism device applied to the periscope lens module, wherein the lens device is arranged between the image sensor and the prism device applied to the periscope lens module, and wherein the prism device applied to the periscope lens module comprises:

a prism;

a bearing member;

a supporting member;

a ball;

an elastic member; and a driving member, wherein the bearing member comprises a bearing frame, and the ball is mounted to a top of the bearing frame; the supporting member comprises a prism bracket, a driving bracket, and a rotating bracket connected between the prism bracket and the driving bracket and in rotation-fit with the ball; the elastic member comprises a first elastic bracket and a second elastic bracket, the first elastic bracket comprises a first abutting portion, and the second elastic bracket comprises a second abutting portion; the first abutting portion and the second abutting portion are spaced from each other and abut against a top of the rotating bracket from two sides of the ball, in such a manner that the rotating bracket and the ball abut against the bearing frame; and the driving member is connected between the bearing member and the driving bracket and configured to drive the supporting member to drive the prism to rotate.

9. The periscope lens module as described in claim 8, wherein the top of the bearing frame is provided with a limiting groove for receiving and locating the ball, and a side of the rotating bracket facing towards the bearing frame is provided with an arc groove for fitting the ball.

10. The periscope lens module as described in claim 8, wherein the bearing member further comprises: a fixing frame parallel to the driving bracket, and a base having an end connected to the fixing frame; and the bearing frame is provided on the base, and the driving member is connected between the fixing frame and the driving bracket.

11. The periscope lens module as described in claim 10, wherein the fixing frame comprises:

a side plate having an end connected to the base;

an FPC board provided between the side plate and the driving bracket; and a plurality of snap joints provided between the side plate and the driving bracket, wherein an end of each of the snap joints penetrates through the FPC board and the side plate to fix the FPC board onto the side plate.

12. The periscope lens module as described in claim 11, wherein an end of the side plate facing away from the base is provided with a first limiting plate for restricting the prism bracket from moving out of the bearing member, and an end of the base facing away from the fixing frame is provided with a second limiting plate for restricting the prism bracket from moving out of the bearing member.

13. The periscope lens module as described in claim 10, wherein the base is provided with a snap groove for limiting a movement of the bearing frame.

14. The periscope lens module as described in claim 13, wherein the first elastic bracket further comprises: two first extending portions extending from two ends of the first abutting portion while being bent, two first bending portions each connected to an end of one of the two first extending portions, two second extending portions each extending from an end of one the two first bending portions, and two first mounting portions each bent from an end of one the two second extending portions; the second elastic bracket further comprises: two third extending portions extending from two ends of the second abutting portion while being bent, two second bending portions each connected to an end of one of the third extending portions, two fourth extending portions each extending from an end of the two second bending portions, and two second mounting portions each bent from an end of one of the two fourth extending portions; and each of the first mounting portion and the second mounting portion is snapped into the snap groove.

15. The periscope lens module as described in claim 11, wherein the driving member comprises a plurality of shape memory alloy wires, and a plurality of hooks is provided at a side of the driving bracket close to the fixing frame; and each of the plurality of shape memory alloy wires comprises two ends respectively fixed to two adjacent snap joints of the plurality of snap joints, and a middle portion connected to one of the plurality of hooks.

16. The periscope lens module as descried in claim 8, wherein a first protrusion and a second protrusion are provided at a side of the rotating bracket facing away from the ball, the first abutting portion abuts against the first protrusion, and the second abutting portion abuts against the second protrusion.

\* \* \* \* \*